United States Patent [19]

Zeman

[11] Patent Number: 5,141,360
[45] Date of Patent: Aug. 25, 1992

[54] IRRIGATION TUBING

[76] Inventor: David Zeman, P.O. Box 42040, Las Vegas, Nev. 89116

[21] Appl. No.: 409,005

[22] Filed: Sep. 18, 1989

[51] Int. Cl.$^5$ .............................................. E02B 13/00
[52] U.S. Cl. ...................................... 405/43; 47/48.5; 71/65; 405/36; 405/45; 138/115
[58] Field of Search ................. 405/43, 45, 36; 71/65; 134/167 C; 138/115, 178; 285/285; 47/48.5

[56] References Cited

U.S. PATENT DOCUMENTS

| | | | |
|---|---|---|---|
| 2,156,604 | 5/1939 | Payne et al. | 285/285 |
| 2,976,191 | 3/1961 | Weston | 71/65 X |
| 3,219,368 | 11/1965 | Crumpler | 71/65 X |
| 3,403,993 | 10/1968 | Hoff | 71/65 |
| 3,903,929 | 9/1975 | Mock | 405/43 X |
| 3,936,380 | 2/1976 | Boske | 405/45 X |

Primary Examiner—Dennis L. Taylor

[57] ABSTRACT

In accordance with the disclosed invention a desirable, elongated irrigation tube having a plastic or polymer peripheral wall in which there are a series of dispensing holes leading from the interior of said tubing to the exterior of said tubing is constructed so as to include at least one of the following: (1) all of said holes having a cross-sectional shape along a section taken perpendicular to the length of said holes such that the ratio of the length of the perimeter of the interior of the wall of each hole to the cross-sectional area of the hole is greater than that of a circle; (2) that said wall includes a body of a plastic material containing an effective amount of a root inhibitor to preclude root growth within said holes and adjacent to said holes at the exterior of said wall; and (3) said wall consisting of an even number of elongated panels and line like areas of reduced thickness which are more flexible than said panels joining said panels, said areas permitting said tubing to automatically fold flat when coiled.

14 Claims, 4 Drawing Sheets

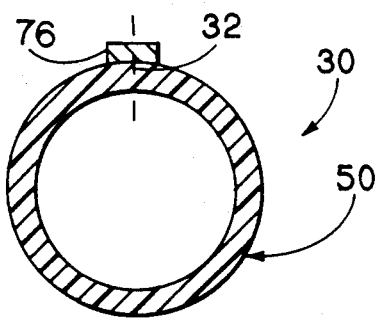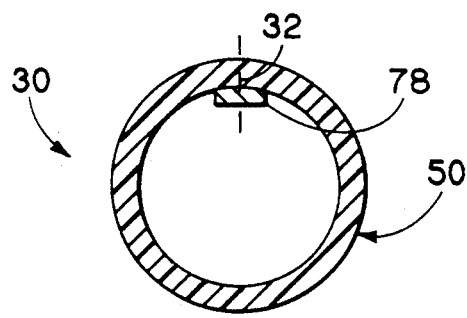
FIG 20          FIG 21
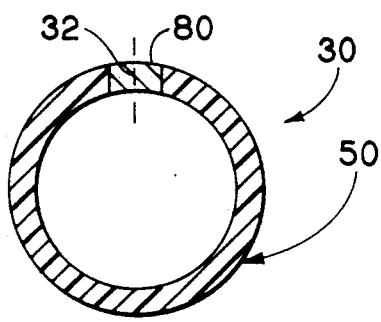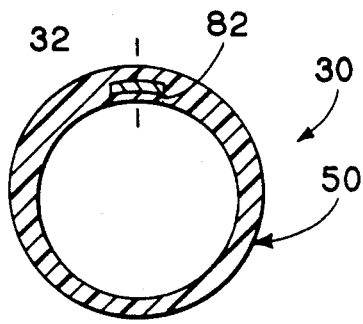
FIG 22          FIG 23
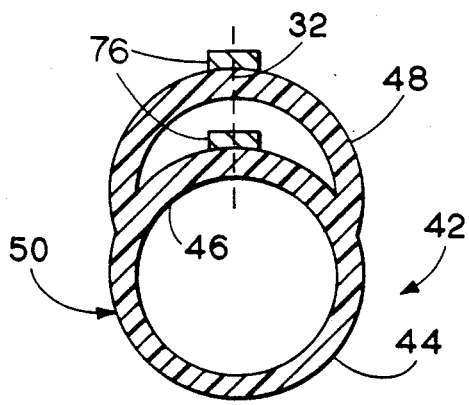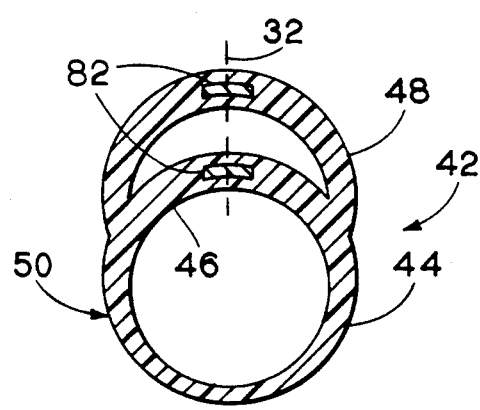
FIG 24          FIG 25
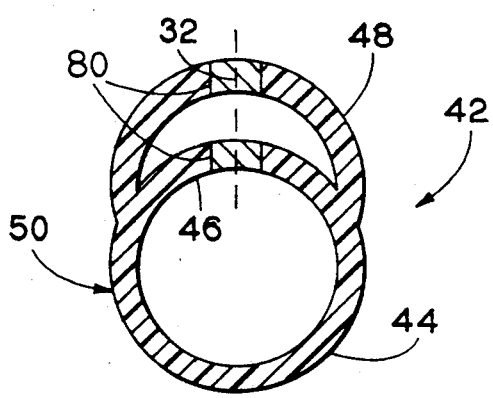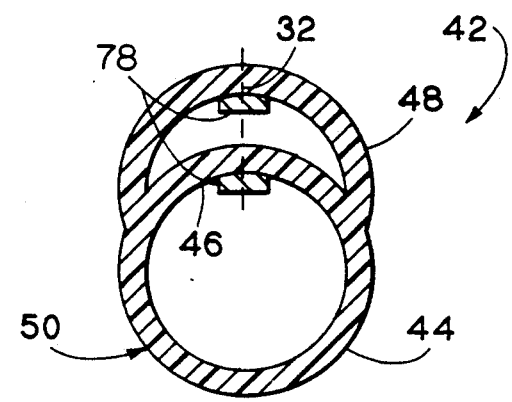
FIG 26          FIG 27

IRRIGATION TUBING

BACKGROUND OF THE INVENTION

The invention set forth and claimed in this specification pertains to new and improved irrigation tubing.

The term or expression "irrigation tubing" as used in this document is a comparatively broad, generic expression intended to cover a wide variety of different physical structures which are employed to distribute water for irrigation or various related purposes. Although most items of irrigation tubing in accordance with the invention will be simple cylindrical tubes of a somewhat flexible, slightly resilient polymer composition having a line of peripheral holes designed to distribute water, many aspects of the invention are in connection with various types of specialized, non-cylindrical irrigation tubing. Thus, the invention is useful with tubing in which two or more separate passages or tubes are connected by holes so as to obtain a pressure step down effect and with tubes in which the angle of a hole through the tubing is slanted relative to the direction of flow in the tube.

Expedients such as are set forth in this last sentence are normally used in order to control the amount of fluid dispensed from a tube to within a desired range. For centuries it has been realized that the amount of water which will move through a hole will be dependent upon the dimensions of the hole and the pressure which causes water to move through the hole. It has also been commonly recognized that surface phenomena or effects within the interior of the hole are significant in controlling the amount of water which will move through a hole. Because there is a reduction of pressure whenever water moves through a hole or orifice it is commonly stated that there is a "pressure drop" associated with the movement of water through a hole.

As an example of this so called "bi-wall" tubing having a principal passage or tube and an auxiliary passage or tube located on the exterior of the principal passage is used so as to obtain a pressure drop as water passes through holes in wall between the primary passage and the auxiliary passage and a further pressure drop as water passes through holes from the auxiliary passage to the exterior of the complete tubing. Within tubing of this latter type the amount of water distributed is limited in accordance with the pressure drops through successive holes as well as a result of other factors.

Similarly it is known to use tubing in association with integrally formed or separate elongated passages of a restricted dimension so that surface effects along the length of a tube will result in a pressure drop in the water moving through such elongated passages and will limit the amount of water dispensed from the passage. It is also common to bend such restricted passages so that water moving through them has to turn in order to develop turbulence tending to further restrict the flow through such passages.

Another method of controlling flow through a passage which has not been used as much as one might expect since it was employed by the ancient Romans consists of slanting a hole leading from a principal passage with respect to the direction of flow in the principal passage. In accordance with this technique the amount of water distributed from a tube can be restricted by slanting the discharge holes from a tube relative to the angle of water flow in the tube generally toward the direction of such flow or can be increased by slanting holes or distribution passages generally toward the direction of flow.

All of these expedients have relative merits and drawbacks. In general those expedients requiring irrigation mutipassage tubes and/or irrigation tubes having elongated passages are utilitarian but nevertheless somewhat undersirable because of the complexities of such tubes. It is considered obvious that normally the simpler a structure and the less the material used in it the less the cost of the structure. Because of the fact that irrigation tubes normally have comparatively thin walls in order to save material and thus lower costs the lengths of the slanted holes which can be provided in such tubes is limited. A consequence of this is that the pressure drop which can be provided with a slanted hole in thin walled tubing is somewhat limited.

Various types of irrigation tubing as discussed in a general manner in the preceding have another limitation. As they are used the amount of water which will pass from them will tend to be limited by root or other growth. Some of such growth will tend to overlie or cover holes leading from such tubes so as to preclude water from passing from such holes. Other such growth will tend to actually penetrate such holes so as to restrict flow through such holes. In either event the result is that an irrigation tube will tend to dispense less and less water as it is used as a result of root growth tending to block the holes leading from the tube. Although in some circumstances such growth may not be a significant factor in other circumstances it can be relatively important. At this time it is believed that known efforts to combat such growth as, for example, by addition of a root growth inhibitor to water as it is distributed through a tube, are not sufficiently desirable to be universally used.

BRIEF SUMMARY OF THE INVENTION

It is believed that it will be apparent from the preceding discussion that there is a need for new and improved irrigation tubing or tubes. The invention is intended to provide new and improved irrigation tubing tending to fulfill this need.

More specifically it is intended to provide irrigation tubing which uses holes having specialized shapes as hereinafter described which are effective in desirably controlling the amount of water dispensed through the holes in such a tube. It is further intended to provide irrigation tubing which is specially constructed so as to use a root growth inhibitor in association with the holes in the tubing. Also it is intended to provide irrigation tubing which is desirable in that it can be folded to a relatively flat configuration during shipment and handling.

In accordance with this invention these different objectives may be used separate from one another. It is possible and, indeed, both desirable and preferable to use both specialized holes together with a root growth inhibitor in association with the holes so as to achieve desired benefits in accordance with the invention. In many cases it is considered that it will be even more beneficial to use all three of the features discussed together. The invention is also intended to provide irrigation tubing using at least one of these features of the invention which can be manufactured at a comparatively nominal cost and which can be satisfactorily used in place of existent, known irrigation tubing.

In accordance with this invention these various objectives are achieved by providing an elongated irrigation tube which has a plastic or polymer peripheral wall in which there are a series of dispensing holes leading from the interior of said tubing to the exterior of said tubing in which the improvement comprises at least one of the following: (1) all of said holes being of multi-sided cross-sectional configuration such that the pressure drop through each of said holes is greater than the pressure drop through a hole of a cylindrical cross-sectional configuration of the same length and cross-sectional area in the same material under identical conditions in a water distribution system; (2) that said wall includes a body of a plastic material containing an effective amount of a root growth inhibitor to preclude root growth within and adjacent to said holes; and (3) said wall consisting of an even number of elongated panels and line like areas of reduced thickness which are more flexible than said panels and which connect the side edges of said panels, said areas permitting said tubing to automatically fold flat when coiled.

BRIEF SUMMARY OF THE DRAWING

Because of the nature of the invention it is best more fully described by referring to the accompanying drawings in which:

In order to provide a frame of reference

FIG. 20 is a cross-sectional view of an embodiment which in effect is a modification of the embodiment of FIG. 2;

FIG. 21 is a cross-sectional view of an embodiment which is another modification of the embodiment of FIG. 2;

FIG. 22 is a cross-sectional view of an embodiment which is a further modification of the embodiment of FIG. 2;

FIG. 23 is a cross-sectional view of an embodiment which is a modification of embodiments as are shown in FIGS. 2 and 7;

FIG. 24 is a cross-sectional view of an embodiment which is a modification of the embodiment of FIG. 4;

FIG. 25 is a cross-sectional view of an embodiment which is another modification of the embodiment of FIG. 4;

FIG. 26 is a cross-sectional view of an embodiment which is a further modification of the embodiment of FIG. 4; and FIG. 27 is a cross-sectional view of an embodiment which is a still further modification of the embodiment of FIG. 4.

Figure 1:
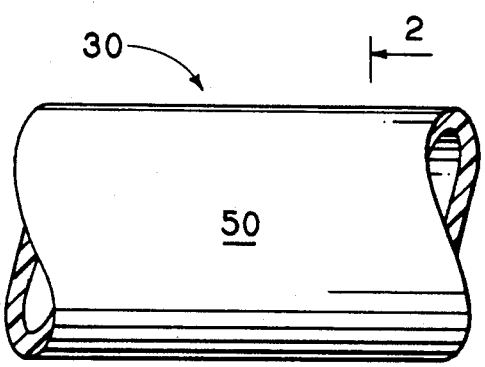
FIG. 1 is a side elevational view of a short length of a cylindrical irrigation tubing in accordance with the invention which in this view appears as common irrigation tubing.

In the subsequent detailed description and in the drawings the same numbers are used in various different figures to designate tubes or tubing or parts of features which are the same or nearly the same in such figures in an effort to simplify an explanation of the invention. The same numbers have been used even if the tubes or tubing in different figures differ as to relatively simple details. Thus, for example, the same number is used to designate the tubing shown in related figures even though there are easily understood differences in the actual tubing illustrated in certain of these figures. In some cases the primes of numbers have been used in the interest of clarity.

From a consideration of the remainder of this description it will be realized that holes of any of the configurations indicated can be used with any of the tubing embodiments shown regardless of whether these tubing embodiments are modified so as to either use a layer or a strip of root growth inhibiting material. It will also be realized that the lay flat feature embodied in the tube shown in FIG. 3 can advantageously be employed without the tubing being perforated. This is because some of the features of the invention can be used independently of one another.

In the drawings all of such matters which are essentially matters of routine skill within the field of the manufacture of irrigation tubing have not been illustrated. It is believed that it would unduly lengthen this specification without significantly increasing an understanding of the invention to attempt to illustrate and specifically describe all of the various permutations in which features and embodiments of the invention can be used together. For these reasons the invention is to be considered as being limited solely by the appended claims and it is to be understood that these claims are intended to define the invention in such a manner that the language employed in them covers modifications and changes in those structures shown and described which are within routine skill in the field of the invention.

DETAILED DESCRIPTION OF THE PREFERRED EMBODIMENTS

Figure 2:
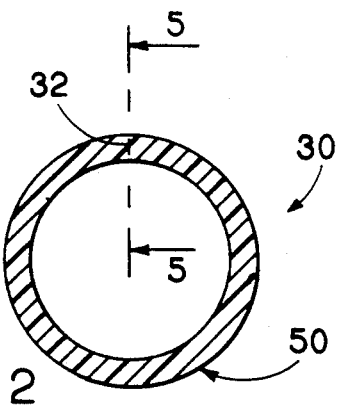
FIG. 2 is a cross-sectional view corresponding to a view taken at line 2—2 of FIG. 1 which has been modified so as to exaggerate the thickness of the peripheral wall of the tubing at an enlarged scale.
Figure 5:
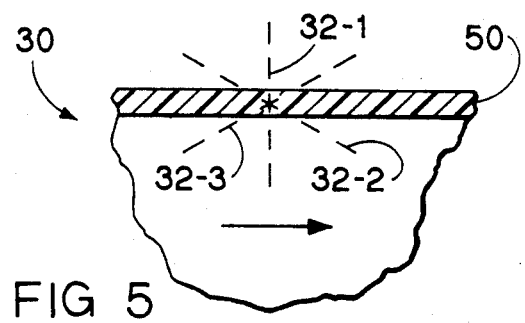
FIG. 5 is an exaggerated partial cross-sectional view substituting dotted lines for a hole corresponding to any of these lines, this view also corresponding to a view taken at line 5—5 of FIG. 2; an exaggerated partial cross-sectional view corresponding to a view taken at line 5—5 of FIG. 3 would be the same as this view.

In FIGS. 1 and 2 of the drawings there is shown a piece of irrigation tubing or tube 30 in accordance with the present invention which differs from prior irrigation tubing solely in the nature of normally identical holes 32 employed in this tube 30. In FIG. 2 of the drawing such a hole 32 is represented by a dotted line since it may be oriented in various manners as illustrated in FIG. 5 and may have any of a plurality of cross-sectional configurations as illustrated in FIGS. 14 to 19.

Normally this tube 30 will be formed by extruding a somewhat flexible, comparatively thin walled tube (not separately illustrated) out of a known plastic, polymer material capable of reasonably withstanding normal ambient conditions and then perforating this thin walled tube with a laser. Since such operations and the materials suitable for using in irrigation tubing are well known it is not considered necessary to discuss either of them more fully in this specification.

Figure 3:
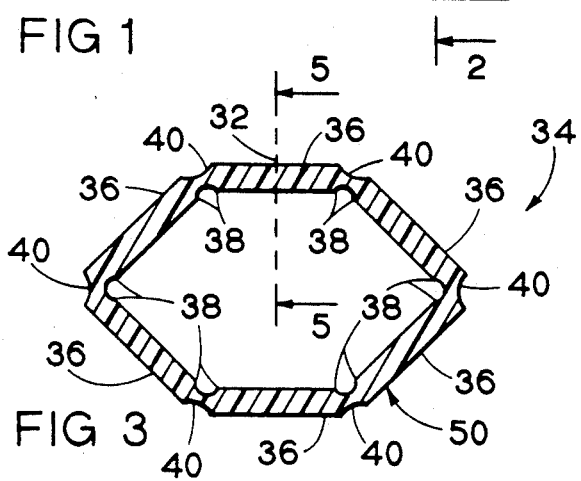
FIG. 3 is view similar to FIG. 2 of a presently preferred folding irrigation tube in accordance with the invention.

A tube 34 which is related to the tube 30 but which differs from the tube 30 only as to its construction is shown in FIG. 3 of the drawing. As illustrated in FIG. 3 this tube 34 has an even number of panels or sides 36 each of which is joined in at its edges 38 by line like areas 40 of reduced thickness so as to enclose the tube 34. When not subjected to internal water pressure these sides 36 are preferably sufficiently stiff or thick so as not to tend to flex or bend under conditions which will cause the areas 40 to flex or bend. In other words the areas 40 are easier to bend than the sides 36; they are capable of acting more or less like hinges. The sides 36 need not be so stiff that they are incapable of bending or flexing under any significant circumstances. These sides 36 can be sufficiently thin so that they will tend to bow outwardly into a reasonably cylindrical configuration when the tube 30 carries water under significant pressure.

As a result of this construction when the tube 34 has an even number or panels 36 which is greater than 4 (at least six panels) the tube will tend to lay flatter than normal cylindrical tubing such as the tube 30 when it is coiled and stored unless, of course, it is filled with fluid as it is coiled and stored. This is because when coiled and stored such cylindrical tubing will tend to only flatten out to a limited extent, and will have "rolled" type ends which do not completely flatten. As opposed to this when the tube 34 is constructed as described. it will flatten out as it is coiled and stored unless it is at the time filled with a fluid. This makes the tubing 34 desirable for many uses when it is imperforate—i.e. without any holes. It is not necessary that all of the panels 36 be of the same dimension. Some can be longer than others so long as they are all coordinated as to size so as to be capable of folding flat or substantially flat.

Figure 4:
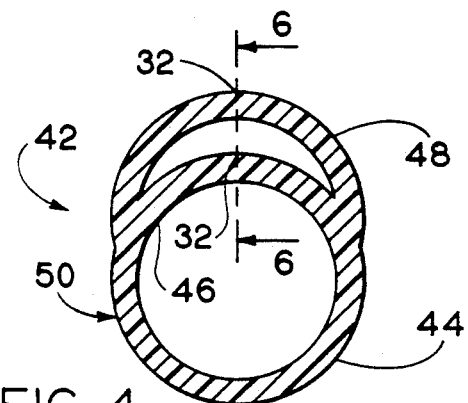
FIG. 4 is a view similar to FIG. 2 of a bi-wall tubing used in accordance with the invention.

A different type of an irrigation tube 42 is shown in FIG. 4. It is a so called "bi-wall" tube which includes a main or primary tube 44 of a circular cross-sectional configuration having a wall portion 46 which is covered by a partially cylindrical wall or secondary tube 48. This particular tube 42 is illustrated as being more or less typical of any of a series of multitube structures which are used to obtain a step down effect as water flows from a primary or principal passage or tube through restricted openings into one or more auxiliary or secondary passages or tubes and thence through other restricted openings to the exterior of the tube 44 in order to obtain a sequential reduction in pressure as water is dispensed.

All of the tubes 30, 34 and 42 include what may be referred to as a peripheral wall 50. Technically in the case of the tube 42 this is misleading. Because of its "bi-wall" character it in a sense includes two peripheral walls 50. In the case of the tube 34 this wall 50 consists of the sides or panels 36 and the areas 40. The walls 50 in each of the tubes 30, 34 and 42 are all provided with holes or openings 32 as subsequently described. These openings are indicated in FIGS. 2, 3 and 4 by dotted lines designated by the numeral 32. Normally the holes or openings 32 will be in a line (not shown) extending along the length of a tube in accordance with known practice.

Figure 6:
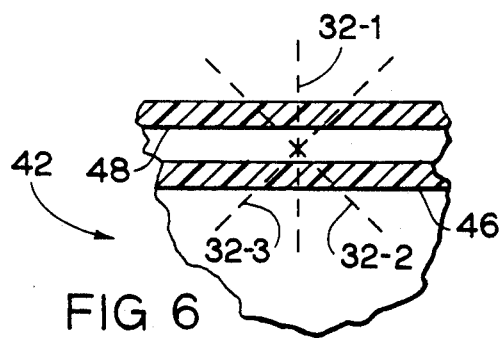
FIG. 6 is an exaggerated partial cross-sectional view substituting dotted lines for a hole corresponding to any of these lines, this view corresponding to a view taken at line 6—6 of FIG. 4.

Although there is a degree of difference in the thickness of the wall 50 in the tube 34 because of the areas 40 the walls 50 in all of the tubes 30, 34 and 42 shown in FIGS. 2 to 4 are substantially of the same thickness. This is not always desirable in practicing the invention. This is because in some cases the wall thickness of a tube will be so thin that it is impossible or impractical to provide perforations or holes 32 in a tube of a desired length in a tubing wall of the minimum thickness reasonably necessary to contain water at the highest pressure to be carried by a tube. This is best explained by referring to FIGS. 5 and 6 of the drawings.

In FIG. 5 the normal or intended direction of water flow in the tube 30 as this tube 30 is used is shown by the only arrow in this figure. A reasonably normal orientation for a hole 32 in the wall 50 of the tube would be perpendicular to the length of the tube 30 as indicated by the line 32-1 in this figure. It is known to slope such a hole 32 generally in the direction of flow as indicated by the line 32-2 so that water flowing in the tube 30 will, in effect, have to turn backwards or opposite to the direction of flow in order to decrease the amount of water emitted from the tube 30 so that it is less than the amount dispensed when the hole 32 is perpendicular to the length of the tube 30 as shown by the line 32-1.

Similarly it is possible to expedite or increase the amount of water dispensed over that emitted when the hole 32 is oriented as shown by the line 32-1 or 2 by slanting the hole 32 as indicated by the line 32-3 so that it is slanted so as to diverge away from the main flow within the tube 30. The precise angle of the slope is considered to be a matter of choice which is to a significant degree dependent upon the thickness of the wall 50. The concepts of varying the angle of a passage in the wall of an irrigation conduit relative to the direction of primary flow in such a conduit as are involved in the angles of the holes 32-1,2 and 3 are not new. They have been known since at least the time of the ancient Roman Empire.

Although the angle of a hole 32 is a matter of choice the flow through such a hole 32 is also related to the internal dimensions of and the length of the hole 32. In general, all other things being equal or substantially equal, the greater the length of a comparatively small hole such as any hole 32 discussed in this document the less the flow through the hole 32. This is considered to be primarily the result of surface effects and the fact that usually there is turbulent flow through such a hole 32. Also, in general, all other things being equal or substantially equal, the larger the diameter of a hole 32 the greater the flow through the hole 32. This also is related to surface effects and the nature of the flow through a hole 32. Further, for the same reasons the greater the length of the cross-sectional perimeter of a hole 32 per unit of cross-sectional area of the hole 32 in general, all other things being equal or substantially equal, the less the flow through the hole 32.

In most irrigation or "seep" applications it is desired to minimize the amount of water distributed or dispensed through any hole such as the hole 32 while maintaining the hole 32 sufficiently large to minimize the chances of particles in the water clogging it. As a result of this the longer the holes 32 in the tube 30 or a similar tube the greater the extent to which the rate at which water is dispensed or emitted is minimized. Such control is in addition to or supplemental to that degree of flow regulation which can be achieved by the angle of a hole 32 to the tube 30 as discussed in the preceding. As a consequence of the fact that in general the longer a hole 32 the less the flow through the hole in many irrigation applications it is necessary or desirable to use walls 50 which are of greater than a minimum thickness necessary to withstand the expected water pressure within a tube such as the tube 30.

It is considered significant that in most practical respects this discussion is valid for a "bi-wall" tube such as the tube 42 described in the preceding. As will be apparent from a consideration of FIG. 6 in a tube such as the tube 42 the amount of flow from the tube 42 is in effect the amount of flow from two separate tubes—the primary tube 44 into the secondary tube 48 and, thence, from the latter to the ambient. Because of the manner in which an irrigation tube 42 is normally manufactured normally the two holes 32 used to obtain a step down type of pressure drop have to be aligned with one another as indicated by the lines 32-1, 32-2, and 32-3. Depending upon the method of manufacture these holes 32 in the wall portion 46 and the tube 48 they need not be in alignment and can be oriented differently relative to the walls in which they are located.

Figure 7:
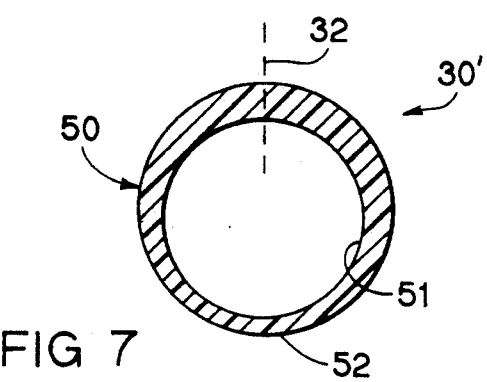
FIGS. 7, 8 and 9 are views corresponding to FIG. 2 of alternate embodiments of tubes in accordance with the invention which are quite closely related to the tubing shown in FIGS. 1 and 2.
Figure 8:
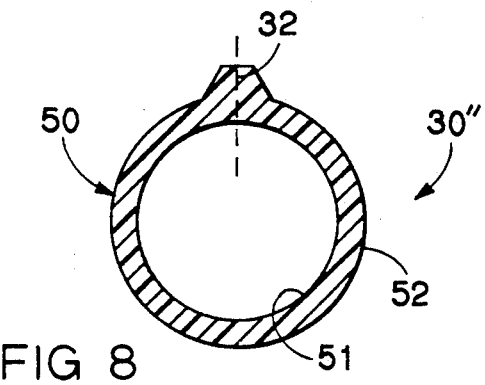
Figure 9:
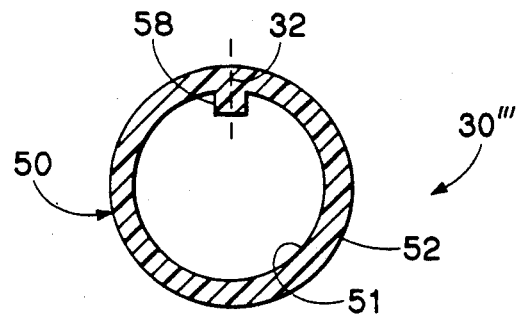

To save material while still providing adequate wall thickness or length for a hole 32 which will provide the desired pressure drop or resistance to flow for a particular application a tube such as the tubes 30, 34 and 42 can be made so that selective portions of the walls 50 are enlarged or thickened so that comparatively elongated holes 32 can be formed in these portions. In FIGS. 7, 8 and 9 three ways of modifying the tube 30 for this purpose are illustrated.

In FIG. 7 the tube 30' is shown as having an eccentric interior 51 and exterior 52 so as to provide a wall 50 of varying thickness, the thickest part 54 of which is adapted to contain whatever hole 32 is desired in accordance with the invention. The tube 30" shown in FIG. 8 is extruded with an elongated external rib 56 forming an part of the wall 50; the tube 30''' shown in FIG. 9 differs by having an internal rib 58 corresponding to the rib 56 except as to location for the purpose of proving enough material to be able to hold an elongated hole 32.

If desired either any two or all three of the expedients shown in FIGS. 7, 8 and 9 can be used together.

Figure 10:
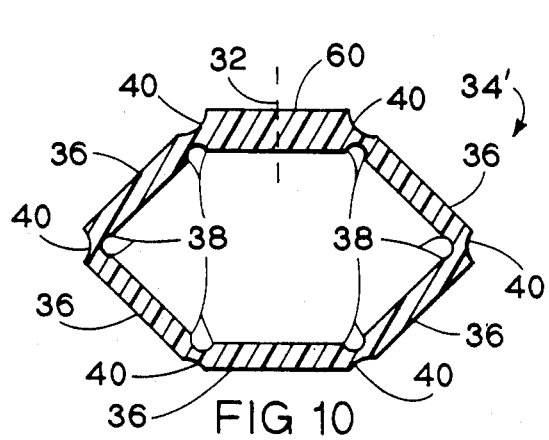
FIGS. 10 and 11 are views corresponding to FIG. 2 of further alternate embodiments in accordance with the invention which are quite closely related to the tubing shown in FIG. 3.
Figure 11:
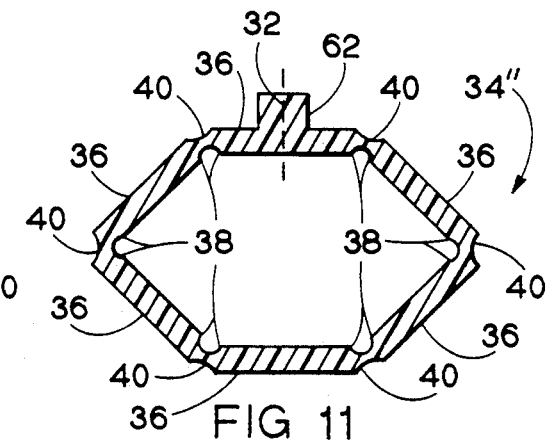

Two different corresponding ways of modifying the tube 34 so as to provide "room" enough within a wall for a comparatively long hole 32 are illustrated in FIGS. 10 and 11. In the tube 34' shown in FIG. 10 one of the sides or panels 36—which is designated in the drawings as a side or panel 60—is thicker than the others for the purpose of providing enough material in a single location to accommodate a comparatively long hole. When such an enlarged panel 60 is used a hole 32 can be formed at an angle which extends generally across the panel 56 instead of in a direction which is lengthwise to the tube 30. Instead of such a panel 60 an enlarged rib 62 can be used with the tube 34 as illustrated in FIG. 11. If desired such a panel 60 can be extruded so as to carry such a rib 62.

Figure 12:
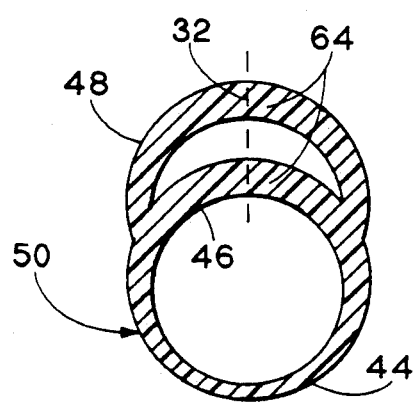
FIGS. 12 and 13 are views corresponding to FIG. 2 of other alternate embodiments in accordance with the invention which are quite closely related to FIG. 4.
Figure 13:
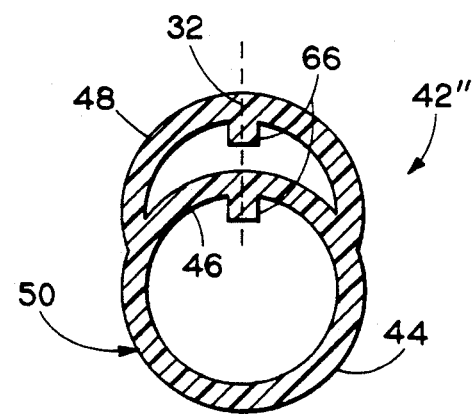

Because of the fact that the tube 42 is of a greater degree of complexity than the tubes 30 and 34 it can be modified in a greater manner of ways than the tube 30 and 34 in order to be manufactured so as to accommodate comparatively elongated holes 32. In FIG. 12 such a tube 42 is shown with both wall 48 and the wall portion 46 enlarged in an eccentric manner corresponding to that shown in FIG. 7 so as to have enlarged or comparative thick portions 64 in which holes such as the hole 32 can be located. The tube 42 illustrated in FIG. 13 differs from the tube as shown in FIG. 12 by the use of internal ribs 66 instead of the portions 64. If desired both of the expedients shown in FIGS. 12 and 13 can be used together in a single tube 42.

Because of the possibility that the preceding discussion relative to FIGS. 7 to 13 can be misconstrued it is considered desirable to emphasize that expedients such as were indicated to thicken portions of a wall 50 are only desirable or needed in those cases where a hole 32 is desired in a tube having a comparatively thin wall. The invention is important in making it possible to increase the "friction" or resistance of flow through such a hole 32 so that the amount of water dispensed or released from a comparatively thin walled tube such as the tubes 31, 34 and 42 is quite limited by providing a construction which will accommodate a hole 32 which is longer than a hole 32 which could be located in the tube if such a specialized enlargements were omitted. On many occasions it will be satisfactory to use holes 32 as subsequently described in thin walled tubing omitting such enlargements in order to obtain a desired flow rate.

The configurations of some of the various holes 32 capable of being used in accordance with the invention in any of the previously described tubes 30, 34 and 48 or any other tube which is the functional equivalent of any of these tubes are shown in FIGS. 14 to 19 of the drawings. For convenience in these figures reference is made only to the tube 30. It is to be understood that any other tube as indicated in the preceding sentence could be substituted for this specific tube 30.

Figure 14:
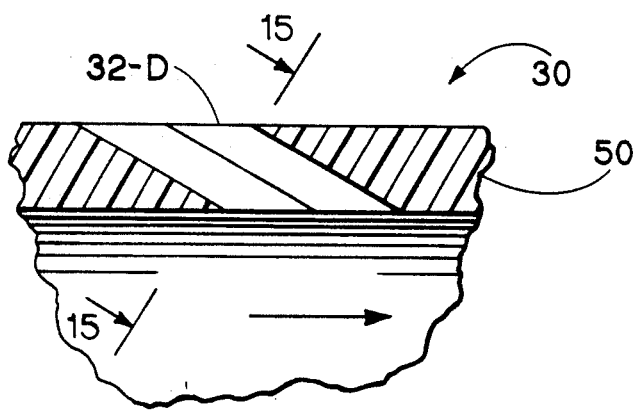
FIG. 14 is a view of another embodiment which is related to the embodiment of FIG. 5 corresponding to FIG. 5 but with an actual hole of a diamond or "tipped" square shape as used with the invention substituted for a dotted line as indicated in FIG. 5.
Figure 15:
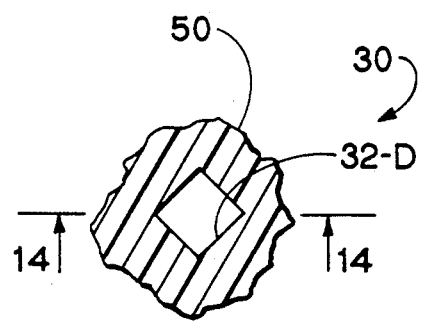
FIG. 15 is a cross-sectional view taken at line 15—15 of FIG. 14 showing the hole cross-sectional configuration.

In FIGS. 14 and 15 there is shown a hole 32-D having a diamond type cross sectional configuration. This particular diamond type cross-sectional configuration is preferred with the invention when the hole 32 is slanted relative to the length of a tube such as the tubes 30, 34 and 42 because of a manufacturing problem on occasion encountered with prior related, slanted, circular holes formed by perforating thin walled tubes with a laser. Such prior holes have had small flaps of incompletely vaporized polymer material at the trailing edge at the intersection of such a hole and the interior of a tube.

Such flaps are considered detrimental in an irrigation tube.

With a hole 32-D normally there will be no such flap at a corner 68 of the hole 32-D where, on the basis of experience with circular holes it could be expected to be located. This corner 68 is located where the periphery (not separately numbered) of the hole 32-D is located at an acute angle to the wall 50. Such small flaps or accumulations have been apparent in prior drip irrigation tubing which is related to the tube 30 but which includes circular holes instead of a hole 32-D as herein discussed. Such flaps are considered detrimental in such tubing.

Figure 16:
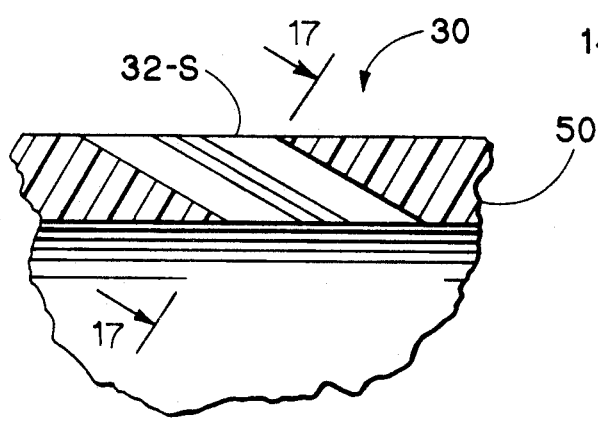
FIG. 16 is a view corresponding to FIG. 14 of an embodiment in which a hole having star shaped cross-sectional configuration is substituted for the diamond shaped hole.

FIG. 16 illustrates the fact that a tube 30 can be formed so as to include a hole 32-S having a star shaped cross-sectional configuration. As subsequently discussed the more points or folds or corrugations to such a star shaped hole 32-S the more desirable such a hole is in achieving a limited flow from the tube 30. However, as a practical matter there is a limit to the number of distinct points of such a configuration which can be formed in comparatively small hole such as the hole 32-S. At present it is considered that such a hole 32-S can be formed having 4 or 5 points without extreme difficulty but that complications may be encountered in further dividing up the interior of the hole 32-S in efforts to produce star shaped holes having six or more points.

Figure 17:
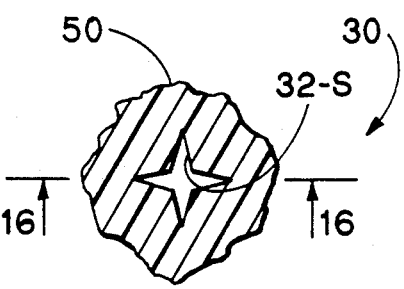
FIG. 17 is a cross-sectional view taken at line 17—17 of FIG. 16 showing the hole cross-sectional configuration.
Figure 18:
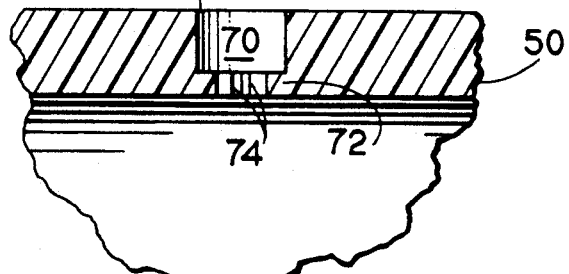
FIG. 18 is a view corresponding to FIG. 15 of an embodiment in which a stepped hole having a short length of a star shaped cross-sectional configuration and an exterior length of a circular cross-sectional configuration is substituted for the star shaped hole.

A hole 32-F which is quite similar to the hole 32-S is indicated in FIG. 17. This particular hole 32-F can be considered as being a stepped hole in as much as it includes a cylindrical bore 70 in a wall 50 and a small section 72 corresponding in cross sectional configuration to the hole 32-S. Because of the short length of the section 72 the individual "points" 74 formed as a result of the star shaped cross-sectional configuration of the section 72 are capable of serving as flaps. Hence, they may be termed "flaps". When, as is normally the case, the tube 30 in this embodiment is formed of a somewhat flexible, somewhat resilient but still self supporting polymer material these flaps 74 will serve to define a star shaped orifice (not separately numbered) serving as a flow channel which will hinder water flowing through the hole 32-F and in so doing provide a pressure drop.

These flaps 74 can be considered desirable because in the event they are engaged by a small particle (not shown) resting against the section 72 at the inside (not separately numbered) of the tube 30 that the water within the tube 30 will act to move the particle against the flaps 74 so as to flex these flaps 74 in such a manner that the pressure of the water will move the particle past them. When this occurs such a particle will be normally flushed through the bore 70 and out of the tube 30. The flaps 74 will normally then tend to return to their initial position. If such a particle will not pass through the flaps 72 it is concurrently believed that it will normally tend to be deflected by them back into the flow within a tube such as the tube 30 or other tubes as described.

Figure 19:
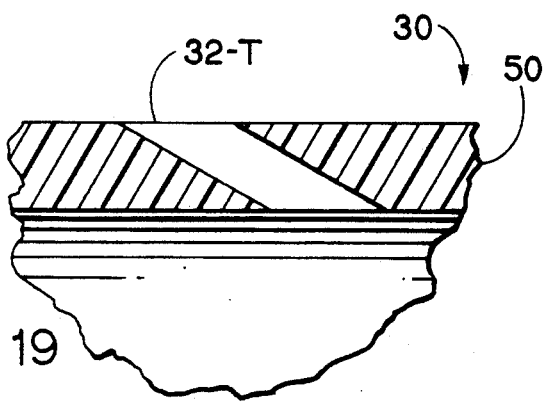
FIG. 19 is a view corresponding to FIG. 16 of an embodiment in which a hole having a triangular cross-sectional configuration is substituted for the star shaped hole.

In FIG. 19 there is shown a further embodiment of a hole of a cross-sectional configuration in accordance with the invention which is useful in controlling flow through the hole. The hole 32-T in the tubing 30 shown in this figure is of the cross-sectional configuration of an equilateral triangle. If desired it could have the cross-sectional configuration of other types of triangles. Such a triangular configuration may be desirable because of the fact that in cross-section it has a larger perimeter per unit area than does a circular hole. On occasion because of manufacturing or other complications it may be desirable to use a hole of a triangular or other cross-sectional configuration having a relatively long cross-sectional perimeter length per unit of cross-sectional area.

From this discussion it is believed that it will be apparent that all of the holes 32 useful in accordance of this invention differ from a conventional circular hole such as has been previously used by being of a multi-sided or multi-surfaced character. The objective in all of the holes in accordance with the invention is to increase the surface area of the wall 44 surrounding the hole 32 to the maximum extent reasonably possible so as to develop as much resistance to flow through a hole 32 as a result of surface effects between water and the interior of the hole as is reasonably possible. Further, the more the interior of a hole 32 is divided or broken up by a multiplicity of non-smoothly joined surfaces defining the hole 32 the greater the probability of the hole configuration promoting significant turbulent flow within the hole 32 and such turbulence further tending to impede flow by causing a further pressure drop in addition to that caused only by surface effects.

Obviously the smaller any hole 32 the greater the pressure drop as water passes through the hole 32 and, therefore, the less the water flow through the hole 32. Because of the fact that this type of flow control is to a significant degree related to the cross-sectional area of a hole it would be desirable to be able to specify the size of a hole 32 in terms of its cross-sectional area. Because of the fact that the invention concerns the use of normally small non-round holes of any of the types indicated it is not reasonably possible to do this. Instead it is considered that the size of any of the holes 32 indicated in the preceding discussion or any related holes can best be specified by comparing to the pressure drop across the length of a hole 32 as described with the pressure drop achieved across a circular hole of the same length under the same conditions.

A hole 32 in accordance with this invention should be of a multi sided cross-sectional configuration and have a cross-sectional area such that the pressure drop through the hole 32 is greater than and preferably at least double the pressure drop of water in a normal water distribution system through a hole of a cylindrical cross-sectional configuration of the same length and cross-sectional area in the same material under identical conditions. This pressure drop will primarily be as a result of the total wall area within the hole 32 being greater than the total wall area of such a cylindrical hole. It is considered that this definition automatically acts to exclude from the invention non-round holes which are so large that surface effects and turbulence caused by or resulting from such turbulence will not result in a normally noticeable or signficant increase in a pressure drop over that obtained by flow through a cylindrical hole of the same cross-sectional configuration under the same or substantially the same conditions. With the manner of defining the size of a hole as indicated in the preceding a limited amount of testing is required to determine whether or not a specific hole 32 is or is not to large to fall within the scope of the invention.

Of course, the actual flow through any such hole will decrease to a degree in accordance with the length of the hole 32. For this reason any such hole 32 used in dispensing water for drip or similar irrigation purposes will normally be as long as reasonably possible. Further, as previously noted the total cross-sectional area of any hole 32 used in accordance with the invention is preferably sufficiently small to achieve a distinct pressure drop—preferably at least twice that which can be achieved with cylindrical hole of the same cross-sectional area and equivalent length under identical circumstances. Because of the fact that precise flow of water in a irrigation tube desired in various different applications will vary significantly it is not considered practical or realistic to define the cross-sectional area of a hole 32 in any other manner.

In those cases where a tube such as any of the tubes 30, 34 and 42 in any of the forms discussed in the preceding is apt to be used under circumstances such that any hole 32 as described in the preceding is apt to blocked by or become plugged by roots or root growth it is at least theoretically possible to form any of the tubes previously described of a polymer material which is filled with or which carries and is capable of dispensing or releasing an amount of a root growth inhibitor which is sufficiently effective to inhibit root growth in the vicinity of any of the holes 32 to a sufficient extent that such holes are not apt to become blocked or clogged during the normal period over which the tubing will be used.

Such tubing can be easily formed completely for a polymer composition of a root growth inhibiting character by known extrusion processes. The techniques by which root growth inhibitors such as the compound sold under the trademark Triflualin can be incorporated within polymers suitable for use as drip irrigation tubing and the maximum loading of such polymers with this and related compositions are both currently known. In view of this it is not considered to discuss either of these items in this specification. Normally such root growth inhibitor compounds are available in a composition of such a character as to be capable of being co-extruded with polymers such as are employed in irrigation tubing or of being bonded to the surface of a tube of such a polymer.

While tubing can be so formed so as to consist entirely of a polymer-root growth inhibitor mixture having root growth inhibiting characteristics—it is considered disadvantageous to form an irrigation tube of such a mixture for several different reasons. It is believed that more of a growth inhibiting compound would be used in any such tube than would be normally needed to prevent clogging or covering of holes in a tube. This would, of course, involve an economic loss. In addition it is considered that it would be undesirable to form a tube of such a root growth inhibiting-polymer composition since it is believed that environmental problems would arise as a result of the fact that the growth inhibitor would tend to be given off from the entire tubing and not merely in the vicinity of the holes in such tubing.

In view of these factors it is considered that any of the irrigation tubes 30, 34 and 48 described in the preceding or any tube which is the functional equivalent of any of these tubes can be modified so as to have a thin, narrow strip or layer 76 on the outside of the wall 50 of the tube 30 in a location in which it is intersected by the holes 32 in the tube 32 as shown in FIG. 20. If desired a corresponding strip or layer 78 can be located within the wall 50 of a tube 30 where it is intersected by holes 32 as shown in FIG. 21. In both of these figures the holes 32 are located so as to pass through the layers 76 and 78.

Although the layer 76 in FIG. 20 can be separately formed and then secured in place through the use of an adhesive it is preferred to form the layers 76 and 78 in both of the embodiments by known co-extrusion techniques. Because of manufacturing considerations normally a layer 78 will extend the length of a tube 30 within which it is located. As opposed to this the layer 76 can but need not extend along the entire length of a tube 30 upon which it is located. If desired it can consists of a series of short, unconnected strips or areas located so as to intersected by holes 32.

Such techniques can also be used to form a wall area or strip 80 in the nature of a plug of root growth inhibiting polymer composition and to locate holes 32 in this strip 80 as shown in FIG. 22. Of course this strip 80 extends the entire length of the tube 30 within which it is located. In this particular figure the holes 32 also go directly through the strip 80 and the strip 80 in effect is a part of the wall 50 of the tube 30. Similarly a small line like area or strip 82 can be located completely within a wall 50 of a tube 30 as indicated in FIG. 23; the holes 32 in this tube 30 are formed so as to intersect and pass through this strip 82.

The strips 76, 78, 80 and 82 can all be used in the tubing 34 in manners which are identical to the manners in which they are used with or in the tubing 30 as previously discussed. Similar strips 76', 78', 80' and 82' can be employed in corresponding locations in connection with the tubing 42 as illustrated in FIGS. 24 to 27 of the drawings. In all cases the location of a particular strip of root growth inhibiting material as well as the precise dimensions of the strip in connection with a specific application will be a matter of choice.

The important thing is of course that any such strip 76, 78, 80 or 82 be of a sufficient dimension so that an effective amount of root growth inhibitor to prevent noticeable or significant clogging or covering of the holes 32 in such tubing will be dispensed into water as the tube provided with such strip is used. The dimensions of any such strip will vary considerable depending upon factors related to such use and can be easily determined for any specific application by simple routine testing.

A choice of which of the various strips 76, 78, 80 and 82 to use in any given application will normally be influenced to at least a degree by the intended storage and handling of the tubing including such a strip and the intended manner of use of the tubing. Because of the fact that root growth inhibitor compounds tend to be somewhat volatile when exposed to the air under usual ambient conditions if any tube such as the tubes 30, 34 and 42 having a strip 76, 78, 80 or 82 is apt to be stored in air for a prolonged period is preferred to used a strip of root growth inhibiting material such as the strip 82.

This is because a strip such as the strip 82 is encased within polymer material which does not contain such root growth inhibitor material. The root grown material will not normally migrate through polymer not containing such material to any extent which is particularly significant. Hence, in a structure employing a strip such as the strip 82 the root growth material is effectively in communication with ambient air only through the holes 32. Because these are normally relatively small comparatively little root growth material can vaporize through these holes 82. As a consequence of this the tendency for root growth inhibiting material in a strip such as the strip 82 to vaporize is minimized.

Further, the use of a strip such as the encased strip 82 is desirable because when a tube 30, 32 or 42 using such a strip is handled there is no significant danger of the hands of a person coming into direct contact with a body of the root growth inhibiting material. In some cases this can be beneficial in minimizing the chances of direct contact of the root growth inhibiting material causing an undesired consequence as a result of it coming into significant, direct contact with a user's hands. This last advantage can be achieved when an internal strip such as the strip 78 can be used. Whenever such an internal strip is employed the direct vaporization of the root growth material to the ambient air is limited as with a strip 82. However, since such a strip 78 will be exposed to any water flowing through a tube there is a chance of an undesirably large amount of the root growth material passing directly into such water.

As an alternative to using a strip such as the strip 82 it is possible to cover any exposed strip such as the 76 with a an adhesively applied tear off cover of a barrier material such as a metal foil (not shown). Another alternative is to package tubing such as the tube 30, 34 and 42 carrying any of the strips 76, 78, 80 or 82 in a package capable of serving as a vapor barrier for the root growth inhibiting composition used.

I claim:

1. An elongated irrigation tube which has a plastic or polymer peripheral wall in which there are a series of dispensing holes leading from the interior of said tubing to the exterior of said tubing in which the improvement comprises:
   said wall includes a body of plastic material containing an effective amount of a root growth inhibitor to tend to preclude root growth within and adjacent to said holes,
   said body being secured to said wall
   each of said holes extending through said plastic material so that water dispensed from the interior of said tube passes through said plastic material.

2. An irrigation tube as claimed in claim 1 wherein there are a series of unconnected bodies of said plastic material located along the length of said tube so as to be intersected by said holes.

3. An irrigation tube as claimed in claim 1 wherein all of said holes being of a multi-sided cross-sectional configuration such that the pressure drop through each of said holes is greater than the pressure drop through a hole of a cylindrical cross-sectional configuration of the same length and cross-sectional area in the same material under identical conditions in a water distribution system.

4. An irrigation tube as claimed in claim 3 wherein all of said holes have a diamond shaped cross-sectional configuration and are oriented so as to extend lengthwise with respect to the length of said tube.

5. An irrigation tube as claimed in claim 3 wherein all of said holes have a triangular shaped cross-sectional configuration.

6. An irrigation tube as claimed in claim 3 wherein all of said holes have a star shaped cross-sectional configuration.

7. An irrigation tube as claimed in claim 6 wherein said star shape has less than 6 points.

8. An irrigation tube as claimed in claim 7 wherein the length of each of said holes of said star shaped cross-sectional configuration is sufficiently short so that areas between the points of the star shape of said holes can flex so as to accommodate the passage of a particle through said holes.

9. An elongated irrigation tube which has a plastic or polymer peripheral wall in which there are a series of dispensing holes leading from the interior of said tubing to the exterior of said tubing in which the improvement comprises:
   said wall includes a body of a plastic material containing an effective amount of a root growth inhibitor to tend to preclude root growth within and adjacent to said holes,
   said body is a strip of plastic material extending the length of said tube,
   said strip being located on the exterior of said wall, said holes extending through said strip.

10. An irrigation tube as claimed in claim 9 wherein all of said holes being of a multi-sided cross-sectional configuration such that the pressure drop through each of said holes is greater than the pressure drop through a hole of a cylindrical cross-sectional configuration of the same length and cross-sectional area in the same material under identical conditions in a water distribution system.

11. An elongated irrigation tube which has a plastic or polymer peripheral wall in which there are a series of dispensing holes leading from the interior of said tubing to the exterior of said tubing in which the improvement comprises:
   said wall includes a body of a plastic material containing an effective amount of a root growth inhibitor to tend to preclude root growth within and adjacent to said holes,
   said body is a strip of plastic material extending the length of said tube,
   said strip is located within the interior of said tube on said wall, said holes extending through said strip.

12. An irrigation tube as claimed in claim 11 wherein all of said holes being of a multi-sided cross-sectional configuration such that the pressure drop through each of said holes is greater than the pressure drop through a hole of a cylindrical cross-sectional configuration of the same length and cross-sectional area in the same material under identical conditions in a water distribution system.

13. An elongated irrigation tube which has a plastic or polymer peripheral wall in which there are a series of dispensing holes leading from the interior of said tubing to the exterior of said tubing in which the improvement comprises:
   said wall includes a body of a plastic material containing an effective amount of a root growth inhibitor to tend to preclude root growth within and adjacent to said holes,
   said body is a strip of plastic material extending the length of said tube,
   said strip being located completely within said wall, said holes extending through said strip.

14. An irrigation tube as claimed in claim 13 wherein all of said holes being of a multi-sided cross-sectional configuration such that the pressure drop through each of said holes is greater than the pressure drop through a hole of a cylindrical cross-sectional configuration of the same length and cross-sectional area in the same material under identical conditions in a water distribution system.

* * * * *